United States Patent [19]

Hashitani et al.

[11] Patent Number: 6,136,901
[45] Date of Patent: Oct. 24, 2000

[54] FLAME-RETARDANT THERMOPLASTIC RESIN COMPOSITION

[75] Inventors: Ryuki Hashitani, Tokyo; Takeshi Wakao, Nagoya; Masahiko Noro, Tokyo; Hisao Nagai, Tokyo; Kouji Okada, Tokyo, all of Japan

[73] Assignee: Techno Polymer Company Limited, Tokyo, Japan

[21] Appl. No.: 08/863,635

[22] Filed: May 27, 1997

[30] Foreign Application Priority Data

Jun. 20, 1996 [JP] Japan ................................ 8-180178

[51] Int. Cl.⁷ ............................................. C08K 5/15
[52] U.S. Cl. ........................... 524/109; 524/411; 524/412
[58] Field of Search .................................. 524/109, 411, 524/412

[56] References Cited

U.S. PATENT DOCUMENTS

| | | | |
|---|---|---|---|
| 4,504,608 | 3/1985 | Kishida et al. | 524/412 |
| 5,250,590 | 10/1993 | Nakai et al. | 524/109 |
| 5,350,802 | 9/1994 | Muskopf et al. | 524/109 |
| 5,376,718 | 12/1994 | Yada | 524/109 |
| 5,395,874 | 3/1995 | Mishima et al. | 524/109 |
| 5,837,799 | 11/1998 | Chen et al. | 524/109 |
| 5,965,644 | 10/1999 | Chen et al. | 524/109 |

*Primary Examiner*—Veronica P. Hoke
*Attorney, Agent, or Firm*—Nixon & Vanderhye

[57] ABSTRACT

The present invention relates to a flame-retardant resin composition comprising:

(A) 60 to 98 wt % of a thermoplastic resin comprising a rubber-reinforced resin (A-1) obtained by graft polymerizing a monomer component (b) comprising an aromatic vinyl or an aromatic vinyl and other monomer (s) copolymerizable therewith in the presence of a rubber-like polymer (a), a polymer (A-2) obtained by polymerizing the monomer component (b), or a mixture of (A-1) and (A-2); and (B) 40 to 2 wt % of a halogen type flame-retardant which comprises a mixture of compounds, the mixture comprising 5 to 60 mol % of a compound (B-1) having epoxy groups at both terminals of the molecular chain, 15 to 70 mol % of a compound (B-2) having epoxy group at one terminal alone and 5 to 80 mol % of a compound (B-3) having no epoxy group at both terminals.

3 Claims, No Drawings

FLAME-RETARDANT THERMOPLASTIC RESIN COMPOSITION

BACKGROUND OF THE INVENTION

The present invention relates to flame-retardant thermoplastic resin compositions and more particularly, relates to flame-retardant thermoplastic resin compositions having excellent mold releasability, heat stability and light resistance.

Flame-retardant ABS resins are widely used in the fields of electrical and electronic appliances, OA equipment and the like because of their capability of providing a good surface appearance to their moldings, excellent moldability and mechanical properties and the like.

In recent years, there has been a tendency that articles of light-color tone are prepared in OA equipment. Since the light-colored articles have a tendency in which the change of color tone in long-time use manifests easily, the resin materials having good light-resistance have come to be used with increasing popularity. Presently, most of these articles are produced by injection molding. With technical innovations in the art of molding, such as automation of the molding operations by the introduction of a hot-runner system and reduction of the molding time, it has been requested for a molding resin material to satisfy the elevated quality requirements and to be free of defective molding. Particularly, as regards the reduction of molding time, it is remarkable that there is a tendency for the so-called whitening phenomenon take place when the molded article is removed, due to reduced cooling time. Therefore, a resin material having good mold releasability is required.

From the environmental and hygienic standpoint, halogenated epoxy oligomers has been used as a flame-retardant which generates little noxious dioxin when burned. Such halogenated epoxy oligomers can be roughly classified into two types: oligomers having epoxy groups at both terminals of the molecular chain (uncapped type) and oligomers in which the terminal epoxy groups have been subjected to ring-opening addition reaction with tribromophenol (capped type).

The uncapped type flame retardants have high light resistance but are very poor in mold releasability and heat stability. On the other hand, the capped type flame retardants exhibit relatively good mold releasability and heat stability but are intolerably low in light resistance. When these two types of flame retardant are used in combination, the deterioration of the respective flame retardants are manifested in the product.

Thus, the mold releasability and light resistance are the antinomic properties, and there is yet available no flame-retardant resin material that is excellent in both mold releasability and light resistance. Therefore, a flame-retardant resin having both excellent releasability and high light resistance has strongly been required.

As a result of the present inventors' earnest studies on the above problem, it has been found that by blending a specific graft copolymer and a specific flame-retardant in a specified ratio, the obtained resin composition shows excellent mold releasability, heat stability and light resistance. The present invention has been attained on the basis of this finding.

SUMMARY OF THE INVENTION

The object of the present invention is to provide a flame-retardant thermoplastic resin composition that has excellent mold releasability, heat stability and light resistance, and is applicable to a wide scope of use.

To attain the object, in a first aspect of the present invention, there is provided a flame-retardant resin composition comprising:

(A) 60 to 98 wt % of a thermoplastic resin comprising a rubber-reinforced resin (A-1) obtained by graft-polymerizing a monomer component (b) comprising an aromatic vinyl compound, or an aromatic vinyl compound and other monomer(s) copolymerizable therewith in the presence of a rubber-like polymer (a), a polymer (A-2) obtained by polymerizing the monomer component (b), or a mixture of the resin (A-1) and the polymer (A-2); and (B) 40 to 2 wt % of a halogen type flame-retardant which comprises a mixture of compounds represented by the following formula (1), the mixture comprising 5 to 60 mol % of a compound (B-1) having epoxy groups at both terminals of the molecular chain, 15 to 70 mol % of a compound (B-2) having epoxy group at one terminal alone and 5 to 80 mol % of a compound (B-3) having no epoxy group at both terminals:

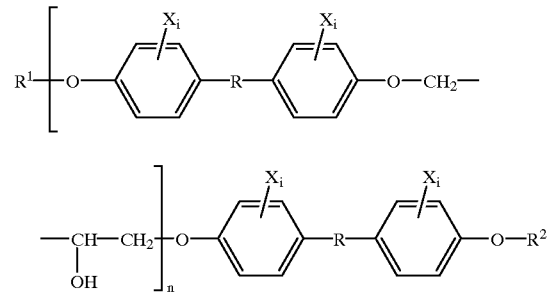

(1)

wherein X is a halogen atom such as bromine or chlorine; n is an integer of 0 or more; i is an integer of 1 to 4; R is a same or different groups of $-C(CH_3)_2-$ or $-CH_2-$; and $R^1$ and $R^2$ are a same or different groups selected from the group consisting of the following formulae (2) and (3):

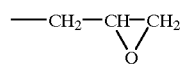

(2)

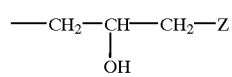

(3)

wherein —Z is a group produced by reacting with a phenolic compound, a carboxylic acid compound, an amine-based compound or an alcoholic compound which are reagents capable of ring-opening addition reaction with the epoxy groups.

In a second aspect of the present invention, there is provided a flame-retardant resin composition comprising:

(A) 60 to 98 wt % of a thermoplastic resin comprising a rubber-reinforced resin (A-1) obtained by graft-polymerizing a monomer component (b) comprising an aromatic vinyl compound or an aromatic vinyl compound and other monomer(s) copolymerizable therewith in the presence of a rubber-like polymer (a), a polymer (A-2) obtained by polymerizing the monomer component (b), or a mixture of the resin (A-1) and the polymer (A-2); and (B) 40 to 2 wt % of a halogen type flame-retardant which comprises a mixture of compounds represented by the following formula (1), the mixture comprising 5 to 60 mol % of a compound (B-1) having epoxy groups at both terminals of the molecular chain, 15 to 70 mol % of a compound (B-2) having epoxy group at one terminal alone and 5 to 80 mol % of a compound (B-3) having no epoxy group at both terminals:

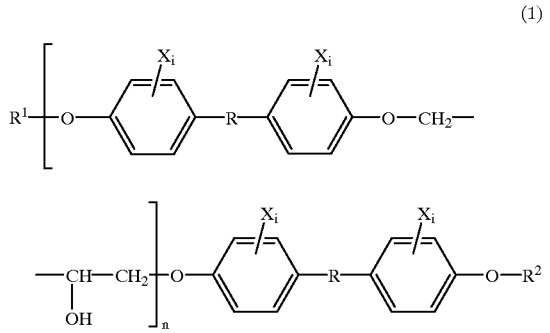
(1)

wherein X is a halogen atom such as bromine or chlorine; n is an integer of 0 or more; i is an integer of 1 to 4; R is a same or different groups of $-C(CH_3)_2-$ or $-CH^2-$; and $R^1$ and $R^2$ are a same or different groups selected from the group consisting of the following formulae (2) and (3):

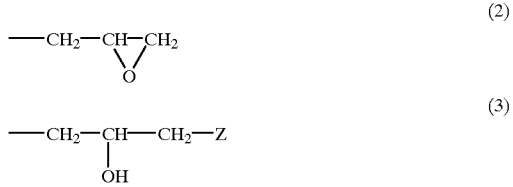
(2)
(3)

wherein —Z is a group produced by reacting with a phenolic compound, a carboxylic acid compound, an amine-based compound or an alcoholic compound which are reagents capable of ring-opening addition reaction with the epoxy groups, the molar ratio of the total of the alkyl groups derived from the following compound ① and the following compound ② in the compound (B-2) to the trihalogenated phenyl groups derived from the following compound ③ in the compound (B-2) being 0.1 to 1:0 to 0.9, the molar ratio of the total of the alkyl groups derived from the following compound ① and the following compound ② in the compound (B-3) to the trihalogenated phenyl groups derived from the following compound ③ in the compound (B-3) being 0.1 to 1:0 to 0.9, and the mixture of compound in the (B) component being obtained by reacting a halogenated epoxy resin having epoxy groups with at least one compound selected from the group consisting of the following compounds ①, ② and ③.

① a monocarboxylic acid having $C_1-C_{10}$ alkyl groups
② a monoalcohol having $C_1-C_{10}$ alkyl groups
③ a trihalogenated phenol

DETAILED DESCRIPTION OF THE INVENTION

The present invention is described in detail below.

The component (A) of the composition of the present invention is a thermoplastic resin comprising a rubber-reinforced resin (A-1) and/or a polymer (A-2).

The rubber-reinforced resin (A-1) can be obtained by graft-polymerizing a monomer component (b) comprising an aromatic vinyl compound or an aromatic vinyl compound and other monomer(s) copolymerizable therewith in the presence of a rubber-like polymer (a). The polymer (A-2) is obtained by polymerizing monomer component (b).

Graft polymerization can be accomplished by conventional methods such as emulsion polymerization, solution polymerization, bulk polymerization and suspension polymerization.

The rubber-like polymers usable in the present invention include polybutadiene, styrene-butadiene block copolymer, polyisoprene, styrene-isoprene (block) copolymer, butadiene-acrylonitrile copolymer, ethylene-propylene-non-conjugated diene polymer, isoprene-isobutylene copolymer, acrylic rubber, hydrogenated diene-based (block, random or homo) polymers such as SEBS, polyurethane rubber, and silicone rubber. Of these polymers, polybutadiene, styrene-butadiene copolymer, ethylene-propylene-non-conjugated diene polymers, hydrogenated diene polymers and silicone rubber are preferred.

The monomer component (b) used for polymerizing the rubber-reinforced resin (A-1) and the polymer (A-2) comprises an aromatic vinyl compound or an aromatic vinyl compound and other monomer(s) copolymerizable therewith.

The aromatic vinyl compounds usable in the present invention include styrene, α-methylstyrene, o-methylstyrene, m-methylstyrene, p-methylstyrene, p-hydroxystyrene, α-ethylstyrene, methyl-α-methylstyrene, dimethylstyrene, bromostyrene, dibromostyrene, tribromostyrene, chlorostyrene, dichlorostyrene, trichlorostyrene, sodium styrenesulfonate and the like. Of these compounds, styrene, α-methylstyrene and p-methylstyrene are preferred.

The other monomers copolymerizable with the aromatic vinyl compounds, which can be used in the present invention, include vinyl cyanide compounds, acrylic or methacrylic ((metha)acrylic) esters, maleimide compounds, maleic anhydride and the like.

The vinyl cyanide compounds usable as other monomers include acrylonitrile, methacrylonitrile and the like, of which acrylonitrile is preferred.

The (metha)acrylic esters include methyl acrylate, ethyl acrylate, butyl acrylate, methyl methacrylate, ethyl methacrylate, butyl methacrylate and the like, of which methyl methacrylate and butyl acrylate are preferred.

The maleimide compounds include maleimide, N-methylmaleimide, N-ethylmaleimide, N-propylmaleimide, N-isopropylmaleimide, N-laurylmaleimide, N-cyclohexylmaleimide, N-phenylmaleimide, N-(2-methylphenyl)maleimide, N-(2,6-diethylphenyl)maleimide, N-(4-carboxyphenyl) maleimide, N-(4-hydroxyphenyl)maleimide, N-(4-bromophenyl)maleimide, tribromphenylmaleimide, N-(4-chlorophenyl)maleimide and the like. In these compounds, N-phenylmaleimide, N-cyclohexylmaleimide, N-(4-hydroxyphenyl) maleimide and tribromophenylmaleimide are preferred.

In the rubber-reinforced resin (A-1), the percentage of the rubber-like polymer (a) is preferably 5 to 70 wt %, more preferably 15 to 65 wt %, and the percentage of monomer (b) is preferably 95 to 30 wt %, more preferably 85 to 35 wt % provided that rubber-like polymer (a)+monomer (b)=100 wt %. When the percentage of the rubber-like polymer (a) in the rubber-reinforced resin (A-1) is less than 5 wt %, no satisfactory impact strength may be obtained, and when its percentage is more than 70 wt %, there may arise problems such as lowering of the graft ratio, reduction of the surface gloss of the resin molding and deterioration of molding workability.

The graft ratio of the rubber-reinforced resin (A-1) is preferably 20 to 160%, more preferably 30 to 155%, even more preferably 40 to 150%. The "graft ratio" referred to herein is the weight ratio of the monomer component (b) graft-polymerized with the rubber-like polymer (a) to 100 parts by weight of the rubber-like polymer (a). In the present invention, this graft ratio is given by the following equation:

Graft ratio (%)=100×(t−s)/s wherein "s" is the weight (g) of the rubber-like polymer (a) contained in 1 g of the rubber-reinforced resin (A-1) and "t" is the weight (g) of the insoluble matter when 1 g of the rubber-reinforced resin (A-1) is dissolved in methyl ethyl ketone.

Since the rubber-like polymer (a) has exceedingly high adhesiveness to metals as compared with the polymer produced from polymerization of the monomer component (b), in case where the graft ratio is less than 20%, the surface of the rubber-like polymer (a) may not be covered sufficiently with the graft chain, resulting in a deteriorated mold releasability. When the graft ratio is more than 160%, fluidity of the composition may be deteriorated and its moldability may be deteriorated.

The thermoplastic resin (A) used in the present invention comprises a rubber-reinforced resin (A-1) alone or a combination of the rubber-reinforced resin (A-1) with a polymer (A-2). In the thermoplastic resin (A), the polymer not grafted to the rubber-like polymer (a), a so-called matrix polymer, has an intrinsic viscosity [η] of usually 0.1 to 1.5 dl/g, preferably 0.1 to 1.0 dl/g measured in methyl ethyl ketone at 30° C. When the intrinsic viscosity [η] of the said polymer is less than 0.1 dl/g, the produced composition may prove to be poor in impact strength, while when the intrinsic viscosity exceeds 1.5 dl/g, moldability of the composition may be deteriorated.

In case where the thermoplastic resin (A) comprises a polymer (A-2) alone, the preferred range of intrinsic viscosity of the polymer (A-2) and its basis are the same as in the case of the polymer (A-1).

The component (B) of the composition of the present invention is a halogen-type flame-retardant that comprises a mixture of the compounds represented by the following formula (1), and comprising 5 to 60 mol % of a compound (B-1) having epoxy groups at both terminals of the molecular chain, 15 to 70 mol % of a compound (B-2) having epoxy group at one terminal alone, and 5 to 80 mol % of a compound (B-3) having no epoxy group at both terminals:

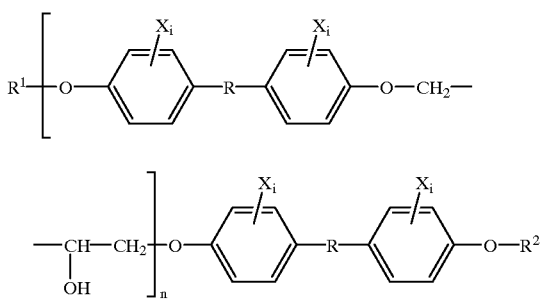

wherein X is a halogen atom such as bromine or chlorine; n is an integer of 0 or greater; i is an integer of 1 to 4; R is a same or different groups selected from the group consisting of —C(CH$_3$)$_2$— and —CH$_2$—; and R$^1$ and R$^2$ are a same or different groups selected from the group consisting of the following formulae (2) and (3):

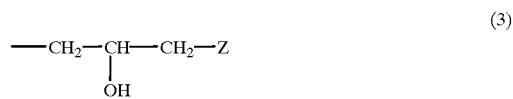

wherein —Z is a group produced by reacting with a phenolic compound, a carboxylic acid compound, an amine-based compound or an alcoholic compound, which are reagents capable of ring-opening addition reaction with the epoxy groups.

The halogen atom X in the component (B) may be, for instance, bromine atom or chlorine atom, the bromine atom being preferred for obtaining a higher flame-retarding effect. In the formula (1), i is an integer of 1 to 4, preferably 2.

Also in the formula (1), n is an integer of 0 or greater. The number-average value of n in the component (B) is preferably 0 to 30, more preferably 0 to 20, even more preferably 0 to 15.

The group —Z contained in the component (B-2) and the component (B-3) is a group produced when a reagent capable of ring-opening addition reaction with the epoxy groups, such as a phenolic compound, a carboxylic compound, an amine compound or an alcoholic compound is reacted, but it is preferably a group of the structure represented by the following formula (4):

wherein X is a halogen atom such as bromine or chlorine, bromine being preferred for obtaining a higher flame-retarding effect, and j is usually an integer of 0 to 5, preferably an integer of 0 to 3, more preferably an integer of 2 or 3. When j is more than 3, the resin composition may be inferior in heat stability and light resistance.

The content of (B-1) in the component (B) is 5 to 60 mol %, preferably 7 to 50 mol %, more preferably 10 to 45 mol %, still more preferably 10 to 40 mol %, the content of (B-2)

is 15 to 70 mol %, preferably 17 to 70 mol %, more preferably 20 to 70 mol %, still more preferably 30 to 70 mol %, and the content of (B-3) is 5 to 80 mol %, preferably 7 to 75 mol %, more preferably 10 to 70 mol %, still more preferably 10 to 50 mol % (provided that (B-1)+(B-2)+(B-3)=100 mol %).

The compound (B-1) is deteriorated in quality when irradiated with light, but its degree of deterioration is prevented since the epoxy groups at both terminals of the molecular chain serve for capturing the halogen atoms released on light irradiation to suppress the deterioration effect of light. The compound (B-1) also contributes to the improvement of light resistance of the resin composition of the present invention in addition to its flame retarding effect. However, when its content is less than 5 mol %, its effect may not be sufficient, resulting in a low light resistance of the composition. On the other hand, the epoxy groups affect disadvantageously mold releasability because of high adhesiveness to metals. The compound (B-1) having the epoxy groups at both terminals has a remarkable influence on mold releasability as compared to (B-2) and (B-3). Thus, when the content of (B-1) is more than 60 mol %, the produced composition may be deteriorated in releasability to cause defective molding.

The compound (B-2) also shows a photo-deterioration inhibitory effect in addition to its flame-retarding effect as the compound (B-2) has the epoxy groups like compound (B-1), and contributes to the improvement of light resistance of the composition. However, when the content of (B-2) is less than 15 mol %, the epoxy group content in the composition becomes too low and light resistance may not be improved. On the other hand, the compound (B-2) has a very low metal adhesiveness as compared to (B-1), but when its content is more than 70 mol %, the composition may be adversely affected in its mold releasability due to the influence of the terminal epoxy groups.

The compound (B-3) has a very low adhesiveness to metals, and it has the effect of improving mold releasability when added to the composition. and thus contributes to the improvement of mold releasability of the composition of the present invention in addition to the flame-retarding effect. However, when its content is less than 5 mol %, it may be unable to suppress metal adhesiveness of the composition imparted by (B-1) and (B-2). The compound (B-3) has its terminals reacted with the epoxy groups, but the bond produced by this reaction is unstable in comparison to the bond of the main chain and may initiate photo-deterioration or heat deterioration of the composition. Therefore, an excess content of (B-3) leads to deterioration of light resistance and heat stability. When its content is more than 80 mol %, it may be impossible to obtain satisfactory light resistance and heat stability.

When the contents of (B-1), (B-2) and (B-3) all fall in the above-defined ranges, there can be obtained a flame-retardant resin composition that is excellent in both mold releasability and light resistance in addition to its flame retardancy.

In the present invention, the component (B) is preferably a halogen type flame-retardant that comprises a mixture of compounds represented by the formula (1), the mixture comprising 5 to 60 mol % of a compound (B-1) having epoxy groups at both terminals of the molecular chain, 15 to 70 mol % of a compound (B-2) having epoxy group at one terminal alone and 5 to 80 mol % of a compound (B-3) having no epoxy group at both terminals, wherein the molar ratio of the alkyl groups derived from the following compound ① in (B-2) and (B-3) and the following compound ② in (B-2) and (B-3) to the trihalogenated phenyl groups derived from the following compound ③ in (B-2) and (B-3) is 0.1 to 1:0 to 0.9, which the above-mentioned mixture of compounds is obtained by reacting a halogenated epoxy resin having epoxy groups and at least one of the compounds ①–③.

① a monocarboxylic acid having $C_1$–$C_{10}$ alkyl groups;
② a monoalcohol having $C_1$–$C_{10}$ alkyl groups;
③ a trihalogenated phenol The flame-retardant (B) can be produced by, for instance, reacting a halogenated epoxy resin having epoxy groups with the compound ①, ② or ③ in the presence of a catalyst, or by reacting a halogenated bisphenol, epichlorohydrin and the compound ①, ② or ③ in the presence of a catalyst.

As the halogenated epoxy resin having epoxy groups, there can be used, for instance, those represented by the following formula (5):

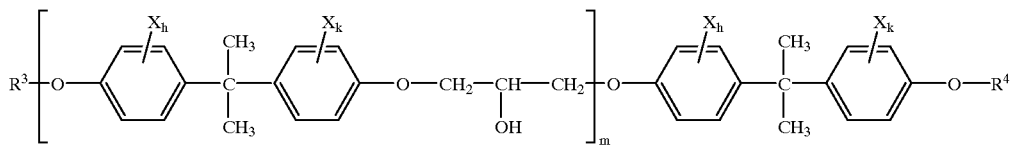

(5)

wherein X is bromine or chlorine; h and k are each an integer of 1 to 4; m is an integer of 0 to 15, which represents the degree of polymerization; $R^3$ and $R^4$ each represents a group of the following formula (6):

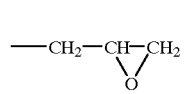

(6)

In the above representations, X is preferably bromine, h and k are each preferably 2 to 4, more preferably 2 to 3.

Further, the average degree of polymerization is preferably 0 to 10, more preferably 0.5 to 8, even more preferably 0.7 to 5.

The compound (B-1) is a flame-retardant of an uncapped molecular structure having epoxy groups at both terminals, which has particularly high light resistance.

In case where the component (B) is the mixture of compounds described above, the contents of the compounds (B-1), (B-2) and (B-3) are preferably as specified below.

In the flame-retardant (B), the content of the compound (B-1) is 5 to 60 mol %, preferably 7 to 50 mol %, more preferably 10 to 45 mol %. When the content of the compound (B-1) exceeds 60 mol %, the composition may be significantly deteriorated in mold releasability and heat stability, and when its content is less than 5 mol %, the light-resistance may be deteriorated.

The content of the compound (B-2) in the flame-retardant (B) is 15 to 70 mol %, preferably 17 to 70 mol %, more preferably 20 to 70 mol %. When the content of the compound (B-2) is too large, light resistance may be deteriorated.

In the compound (B-2), the molar ratio of the alkyl groups derived from the compounds ① and ② to the trihalogenated phenyl groups derived from the compound ③ is preferably 0.1 to 1:0 to 0.9, more preferably 0.2 to 1:0 to 0.8, even more preferably 0.4 to 0.9:0.1 to 0.6. Excellent light resistance is provided when the compound ③ is used in the amount within the above-defined ratio of (①+②):③. By use of tribromophenyl group as the compound ③, the flame retardancy of the resin composition is improved.

The content of the compound (B-3) in the flame-retardant (B) is 5 to 80 mol %, preferably 7 to 75 mol %, more preferably 10 to 70 mol %. When the content of the compound (B-3) is less than 5 mol %, the composition may be deteriorated in heat stability and mold releasability, and when its content exceeds 80 mol %, the light resistance may be deteriorated.

In the compound (B-3), the molar ratio of the alkyl groups derived from the compounds ① and ② to the trihalogenated phenyl groups derived from the compound ③ is preferably 0.1 to 1:0 to 0.9, more preferably 0.2 to 1:0 to 0.8, even more preferably 0.4 to 0.9:0.1 to 0.6. Excellent light resistance is obtained when the compound ③ is used in an amount within the above-defined ratio range of (①+②):③. By use of tribromophenyl group as the compound ③ the flame retardancy of the composition is improved.

The carbon number of the terminal alkyl groups derived from the compound ① and the compound ② in the compound (B-2) and the compound (B-3) is preferably 1 to 10, more preferably 2 to 8, even more preferably 3 to 6. When the carbon number is more than 10, the flammability properties of the composition are reduced due to drop of the bromine content of the flame-retardant.

Terminal alkyl groups derived from the compounds ① and ② include long-chain alkyl groups, branched alkyl groups, phenylalkyl groups, and those alkyl groups partially substituted by chlorine or bromine. Preferred examples of the alkyl groups include methyl, ethyl, propyl, butyl, pentyl, hexyl, methylphenyl, etc., of which propyl, butyl, pentyl and hexyl are especially preferred.

As for the mixing percentages of the thermoplastic resin (A) and the flame-retardant (B) in the flame-retardant resin composition of the present invention, the component (A) is 60 to 98 wt %, preferably 70 to 98 wt %, more preferably 75 to 97 wt %, and the component (B) is 40 to 2 wt %, preferably 30 to 2 wt %, more preferably 25 to 3 wt % provided that (A)+(B)=100 wt %. When the percentage of the component (B) is less than 2 wt %, the desired flame retardancy may not be obtained, and when its percentage is more than 40 wt %, the impact strength of the composition may be deteriorated.

The content of the rubber-like polymer (a) in the flame-retardant resin composition of the present invention is optional, but for the reason of offering a good balance of impact strength and moldability, it is preferable that the content of the rubber-like polymer (a) is 4 to 30 parts by weight, more preferably 5 to 25 parts by weight, even more preferably 6 to 20 parts by weight, based on 100 parts by weight of the composition.

The flame-retardant resin composition of the present invention may contain, beside its essential component (B), other types of flame-retardants, for example, halogen type flame-retardants such as tetrabromobisphenol A, its polycarbonate oligomers, ethylenebistetrabromophenyl and ethylenebistetrabromophthalimide, phosphorus type flame-retardants such as triphenyl phosphate and triphenyl phosphite, triazine type flame-retardants, phosphorus/halogen type flame-retardants, etc., as far as (B) is contained as an essential component. The amount of these additive flame-retardants added in the composition is preferably not more than 20 parts by weight, more preferably 0 to 15 parts by weight, based on 100 parts by weight of the composition.

It is possible to add a flame retardant adjuvant(s) for the purpose of improving the flame retardative effect of the flame-retardant. Examples of the flame retardant adjuvants usable in the present invention are the antimony-containing compounds such as antimony trioxide, antimony tetraoxide, (colloidal) antimony pentoxide, sodium antimonate, antimony phosphate, etc., and metal oxides such as zinc titanate. Of these adjuvants, the antimony-containing compounds are preferred, and antimony trioxide is the most preferred. Addition of an antimony type flame-retardant adjuvant produces a synergism in improving the flame retardancy of the halogen type flame-retardants.

The amount of the flame-retardant adjuvant(s) used in the composition of the present invention is usually not more than 15 parts by weight, preferably 0.5 to 15 parts by weight, more preferably 0.7 to 10 parts by weight, even more preferably 0.8 to 8 parts by weight, based on 100 parts by weight of the composition ((A)+(B)). When the amount of the adjuvant added is less than 0.5 part by weight, it may be difficult to obtain the desired synergistic effect of improving flame retardancy, and when the amount exceeds 15 parts by weight, the composition may be badly deteriorated in impact resistance.

The resin compositions, when burned, are melted and drip down with flames, enlarging the damage of a fire. In order to suppress dripping of the resin when burned, an anti-drip agent is usually contained in the flame-retardant resin compositions. In the flame-retardant resin composition of the present invention, there may also be contained a compound which starts a crosslinking reaction when burned, for example, halogenated polyolefins such as chlorinated polyethylene, vinyl chloride, polytetrafluoroethylene, silicone compounds such as polydimethylsiloxane, silicone rubber or a product of graft polymerization thereof with a resin material, polyphenylene oxide, phenol resins, etc. Of these compounds, halogenated polyolefins are preferred, chlorinated polyethylenes being especially preferred. In the present invention, it is possible to use all types of commercially available chlorinated polyethylenes, but in an effort to balance the anti-drip effect and heat stability, it is preferred to use a chlorinated polyethylene with a chlorine content of 10 to 45 wt %, preferably 15 to 40 wt %.

An anti-drip agent is added in an amount usually not more than 10 parts by weight, preferably 0.5 to 10 parts by weight, more preferably 0.5 to 8 parts by weight, based on 100 parts by weight of the composition ((A)+(B)). When the amount of the anti-drip agent is less than 0.5 parts by weight, sufficient anti-drip effect may not be obtained, and when its amount exceeds 10 parts by weight, the composition may be deteriorated in heat stability.

In the flame-retardant composition of the present invention may be blended other types of thermoplastic resins, for example, polycarbonate resins, polyolefin resins, polyamides, polyester resins such as polybutylene terephthalate and polyethylene terephthalate, polysulfones, vinylidene polyfluoride, polyamide elastomers, and styrene resins other than those used for the component (A). It is also possible to blend a compatibilizing agent such as graft polymers or block copolymers for improving dispersibility or compatibility of the resins as well as various other compounding additives.

The compounding additives which can be blended in the composition of the present invention include antioxidants such as 2,6-di-tert-butyl-4-methylphenol, 2-(1-methylcyclohexyl)-4,6-dimethylphenol, 2,2-methylene-bis-(4-ethyl-6-tert-butylphenol), 4,4'-thiobis-(6-tert-butyl-3-methylphenol), dilauryl thiodipropionate and tris(di-nonylphenyl)phosphite; ultraviolet absorbers such as p-tert-butylphenyl salicylate, 2,2'-dihydroxy-4-methoxybenzophenone and 2-(2'-hydroxy-4'-n-octoxyphenyl)benzotriazole; light stabilizers such as bis(2, 2,6,6-tetramethyl-4-pyridyl)sebacate; lubricants such as polyolefin waxes, ethylenebisstearylamide, hydrogenation-hardened castor oil, stearyl stearate, montan waxes and polyethylene oxide waxes; heat stabilizers such as tin malate and calcium stearate; halogen scavengers such as hydrotalcite and zeolite; antistatic agents such as stearoamidopropyldimethyl-β-hydroxyethylammonium nitrate; colorants such as titanium oxide and carbon black; fillers such as calcium carbonate, clay silica, glass fiber, glass bead and carbon fiber; and pigments.

The thermoplastic resin composition of the present invention can be obtained by mixing the component materials by using a suitable mixing means such as various types of extruders, Banbury mixers, kneaders, roll mills, etc. For example, the component materials are mixed by a mixer, and the mixture is melted and kneaded by an extruder and then granulated. Alternatively, the component materials may be directly melted, mixed and molded in a molding machine. Mixing of the component materials may be effected either by collective mixing or by mixing according to a multi-stage addition system.

The thus obtained resin composition of the present invention is molded into a desired article by a suitable molding method such as injection molding, sheet extrusion, vacuum molding, foam molding, etc.

Since the flame-retardant resin composition of the present invention has excellent mold releasability and light resistance, the resin composition is particularly useful for application to articles that are required to be endurable against change of color tone even in long-time use, such as OA machines and domestic electrical appliances. Further, according to the resin composition of the present invention, because of its excellent mold releasability, it is possible to significantly reduce the rejection rate in the molding process. In this respect, the present invention is of very high industrial value and utility.

EXAMPLES

The present invention is described in further detail hereinbelow by showing the examples thereof, which examples however are merely intended to be illustrative and not to be construed as limiting the scope of the invention in any way.

For facilitating the understanding of the present invention, the evaluation method are explained below.
Evaluation of Mold Releasability Each test composition was injection-molded into a flat plate (300 mm×100 mm×3 mm) having 15 columnar bosses (inner diameter=2 mm; outer diameter (top)=5 mm; outer diameter (base)=6 mm; height=15 mm) to provide a constant amount of cushion (6 mm), at a molding temperature of 240° C. and a mold temperature of 60° C. The force acting on the ejection pin at the time of withdrawal of the molded product was measured by a load sensor and given here as a measure of mold releasability. The smaller the force acting on the ejection pin, the better the mold releasability. In the present invention, this force is preferably not more than 100 kgf.
Evaluation of Light-resistance An injection-molded flat plate (80 mm×55 mm×2.4 mm) of each test composition was irradiated with light from a xenon lamp (max. wavelength=340 nm) for 300 hours and the change of color tone during this treatment was evaluated in terms of Hunder color difference $\Delta E$. The smaller the change of color tone, the better the light resistance of the composition tested. In all of the flame-retardant resin compositions used for the evaluation, titanium oxide was added in an amount of one part by weight based on 100 parts by weight of the composition, but the flame-retardant resin compositions according to the present invention are not limited to those containing titanium oxide. In the present invention, $\Delta E$ is preferably not more than 3.0.
Evaluation of Flame Retardancy (combustion resistance)

Flame retardancy was evaluated according to UL-94 by subjecting each test piece (125 mm×13 mm×2 mm) to a vertical flame test.
Combustion Time Each test piece (5"×1/12"×1/10") was subjected to the vertical flame test according to the UL-94 standards, and the total time of combustion after 10 times of contact with the flames was calculated. In the present invention, the combustion time is preferably not more than 50 seconds and the less time, the better.
Impact Strength Using a high-speed impact tester Servopulsar manufactured by Shimadzu Corp., the energy required for breaking the test piece was measured under the conditions of: test piece thickness=2.4 mm; testing velocity=2.4 m/s; striker end=6.4 R; bearer hole diameter=38 nm. In the present invention, the energy required for breaking the test piece is preferably not less than 100 kgf-cm.
Heat Stability Each test composition was subjected to residence in an injection molding machine for 0.5-hour at 280° C. and subjected to molding thereafter to obtain a molded article. The appearance of the obtained molded article was visually observed. The heat stability of each test composition was evaluated by the following criterion:

⊚ Excellent: Discoloration is slight or not observed.

○ Good: A little discoloration is observed.

Δ Mediocre: Clear discoloration is observed.

X Bad: Marked discoloration is observed.

In the present invention, the molded article should be rated ⊚ or ○.

Examples 1–6 and Comparative Examples 1–3

The following rubber-reinforced resins were used in Examples 1–6 and Comparative Examples 1–3.

The rubber-reinforced resins (11) and (12) used as the component (A-1) of the compositions of the present invention were prepared by polymerizing styrene and acrylonitrile in the presence of polybutadiene (used as rubber-like polymer).

The rubber-reinforced resin (11) has a graft ratio of 80%, a weight ratio of acrylonitrile in the copolymer of styrene and acrylonitrile (hereinafter referred to as acrylonitrile content) of 25 wt %, and a rubber content of 40 wt %.

The rubber-reinforced resin (12) has a graft ratio of 110%, an acrylonitrile content of 25 wt % and a rubber content of 40 wt %.

The polymer (13) used in the Examples and the Comparative Examples as component (A-2) is a styrene/acrylonitrile copolymer having an acrylonitrile content of 25 wt %.

The following flame-retardants (21)–(27) were used as component (B) in the Examples and the Comparative Examples.

The flame-retardants (21)–(23) were prepared by reacting tribromophenol with a polymer of tetrabromobisphenol A diglycidyl ether and tetrabromobisphenol A.

The flame-retardant (21) is a compound having a number-average molecular weight Mn of 1,700, an epoxy group concentration E of 0.00058 mol/g and an acid value of 0.1 KOH-mg/g, and comprises 24 mol % of a compound component having epoxy groups at both terminals of the molecular chain, 50 mol % of a component having an epoxy group at one terminal and having tribromophenol added to the other terminal, and 26 mol % of a component having tribromophenol added to both terminals. Here, "epoxy group concentration E" indicates the number of moles of the terminal epoxy groups contained in 1 g of the flame-retardant, and "acid value" signifies the weight (mg) of potassium hydroxide necessary for neutralizing the acid groups in 1 g of the flame-retardant.

The flame-retardant (22) is a compound with Mn=2,000, E=0.00040 mol/g and acid value=0.2 KOH-mg/g, comprising 16 mol % of a compound component having epoxy groups at both terminals, 48 mol % of a component having epoxy group at one terminal and having tribromophenol added to the other terminal, and 36 mol % of a component having tribromophenol added to both terminals.

The flame-retardant (23) is a compound with Mn=2,000, E=0.00010 mol/g and acid value=0.1 KOH-mg/g, comprising 1 mol % of a compound component having epoxy groups at both terminals, 18 mol % of a component having epoxy group at one terminal and having tribromophenol added to the other terminal, and 81 mol % of a component having tribromophenol added to both terminals.

The flame-retardant (24) is a compound obtained by reacting tetrabromobisphenol A diglycidyl ether and tribromophenol, the compound having an epoxy group concentration E of 0.00088 mol/g and an acid value of 0.1 KOH-mg/g and comprising 28 mol % of a component having epoxy groups at both terminals, 50 mol % of a component having an epoxy group at one terminal and having tribromophenol added to the other terminal, and 22 mol % of a component having tribromophenol added to both terminals.

The flame-retardant (25) is a compound obtained by reacting tribromophenol with a polymer of tetrabromobisphenol F diglycidyl ether and tetrabromobisphenol F. Mn=1,700; E=0.00060 mol/g; acid value=0.2 KOH-mg/g. It comprises 26 mol % of a component having epoxy groups at both terminals, 50 mol % of a component having an epoxy group at one terminal and having tribromophenol added to the other terminal, and 24 mol % of a component having tribromophenol added to both terminals.

The flame-retardant (26) is a polymer of tetrabromobisphenol A diglycidyl ether and tetrabromobisphenol A, with Mn=1,600, E=0.00125 mol/g and acid value=0.1 KOH-mg/g.

The flame-retardant (27) is a compound obtained by reacting dibromophenol with a polymer of tetrabromobisphenol A diglycidyl ether and tetrabromobisphenol A, with Mn=2,000, E=0.00040 mol/g and acid value=0.1 KOH-mg/g. It comprises 16 mol % of a component having epoxy groups at both terminals, 48 mol % of a component having an epoxy group at one terminal and having dibromophenol added to the other terminal, and 36 mol % of a component having dibromophenol added to both terminals.

Antimony trioxide was used as flame-retardant adjuvant and polyethylene chloride as anti-drip agent.

The formulation ingredients were melted and kneaded at 190–220° C. by an extruder having a barrel inner diameter of 50 mm and pelletized to prepare the flame-retardant resin compositions used in the Examples and the Comparative Examples.

TABLE 1

|  |  | Unit | Ex. 1 | Ex. 2 | Ex. 3 | Ex. 4 | Ex. 5 |
|---|---|---|---|---|---|---|---|
| Rubber reinforced | (11) | wt % (1) |  | 25 |  | 35 | 30 |
| resin (A-1) | (12) | wt % | 25 |  | 35 |  |  |
| Polymer (A-2) | (13) | wt % | 57 | 60 | 50 | 49 | 55 |
| Flame-retardant | (21) | wt % | 18 |  |  |  |  |
|  | (22) | wt % |  | 15 |  |  | 12.8 |
|  | (23) | wt % |  |  |  |  |  |
|  | (24) | wt % |  |  | 15 |  |  |
|  | (25) | wt % |  |  |  | 16 |  |
|  | (26) | wt % |  |  |  |  | 2.2 |
|  | (27) | wt % |  |  |  |  |  |
| Antimony trioxide |  | wt parts (2) | 6 | 6 | 6 | 6 | 6 |
| Polyethylene chloride |  | wt parts | 0 | 3 | 3 | 0 | 3 |
| Content of (B-1) |  | mol % (3) | 24 | 16 | 28 | 26 | 28 |
| Content of (B-2) |  | mol % | 50 | 48 | 50 | 50 | 41 |
| Content of (B-3) |  | mol % | 26 | 36 | 22 | 24 | 31 |
| Mold releasability |  | Kg – f | 72 | 60 | 75 | 74 | 79 |
| Light-resistance ΔE |  |  | 3.8 | 4.5 | 4.1 | 4.0 | 3.7 |
| Flame retardancy UL-94 |  |  | V-0 | V-0 | V-0 | V-0 | V-0 |

|  |  | Unit | Ex. 6 | Comp. Ex. 1 | Comp. Ex. 2 | Comp. Ex. 3 |
|---|---|---|---|---|---|---|
| Rubber reinforced | (11) | wt % (1) | 25 | 25 | 25 |  |
| resin (A-1) | (12) | wt % |  |  |  | 25 |
| Polymer (A-2) | (13) | wt % | 60 | 60 | 60 | 57 |
| Flame-retardant | (21) | wt % |  |  |  |  |
|  | (22) | wt % |  |  |  |  |
|  | (23) | wt % |  | 15 |  | 9 |
|  | (24) | wt % |  |  |  |  |
|  | (25) | wt % |  |  |  |  |
|  | (26) | wt % |  |  | 15 | 9 |
|  | (27) | wt % | 15 |  |  |  |
| Antimony trioxide |  | wt parts (2) | 6 | 6 | 6 | 6 |
| Polyethylene chloride |  | wt parts | 3 | 3 | 3 | 0 |
| Content of (B-1) |  | mol % (3) | 16 | 1 | 100 | 51 |
| Content of (B-2) |  | mol % | 48 | 18 | 0 | 9 |
| Content of (B-3) |  | mol % | 36 | 81 | 0 | 40 |
| Mold releasability |  | Kg – f | 62 | 52 | 230 | 180 |
| Light-resistance ΔE |  |  | 3.9 | 11.5 | 2.4 | 7.5 |
| Flame retardancy UL-94 |  |  | V-0 | V-0 | V-0 | V-0 |

As is apparent from Table 1, the compositions of Examples 1–6, in which the scope of claim of the present invention are satisfied, show a high level of mold releasability and excellent light-resistance. In contrast to this, the compositions of Comparative Examples 1–6, in which the claimed scope of the present invention is not satisfied, does not show the quality of Examples 1–6 which are excellent in both mold releasability and light-resistance.

Examples 7–15 and Comparative Examples 4–11

Preparation of Thermoplastic Resin (A)

The resins with various graft ratios were produced by using a polybutadiene latex having an average particle size of 3,500 Å as rubber-like polymer and styrene and acrylonitrile as monomers. There was also produced a resin by polymerizing styrene and acrylonitrile alone. The compositions of these resins are shown in Table 2.

TABLE 2

| Rubber-like polymer, parts by weight | Monomers, parts by weight Styrene | Monomers, parts by weight Acrylonitrile | Graft ratio (%) |
|---|---|---|---|
| (A)-1 | 30 | 49 | 21 | 80 |
| (A)-2 | 40 | 42 | 18 | 55 |
| (A)-3 | 65 | 25 | 10 | 32 |
| (A)-4 | 30 | 49 | 21 | 115 |
| (a-1) |  | 70 | 30 |  |

(A)-1 to (A)-4 were obtained by emulsion polymerization, and (a-1) was obtained by solution polymerization.

Preparation of Flame-retardants (B)

The flame-retardants (B) were prepared by reacting an alkyl monoalcohol and tribromophenol with the epoxy groups in a halogenated epoxy resin flame-retardant having epoxy groups at both terminals, by varying the amount ratios of the alkyl monoalcohol and tribromophenol (TBP) to the halogenated resin flame-retardant. The formulations of the flame-retardants (B) are shown in Table 3.

With the formulations shown in Table 4, the materials were mixed by a mixer for 3 minutes, melt extruded from a 50 mm extruder at a cylinder temperature of 180–210° C. and pelletized. The pellets were injection molded at a cylinder temperature of 200° C. and a mold temperature of 50° C. to obtain the test pieces for evaluation. The results of evaluation conducted with these test pieces are shown in Table 4.

TABLE 3

| Component (B) | (B-1) mol % | (B-2) R2 | (B-2) Ratio 1 | (B-2) mol % |
|---|---|---|---|---|
| (B)-1 | 25 | Butyl group | 1/0 | 50 |
| (B)-2 | 16 | Butyl group | 1/0 | 48 |
| (B)-3 | 36 | Hexyl group | 1/0 | 48 |
| (B)-4 | 12.5 | Butyl group | 1/0 | 25 |
| (B)-5 | 12.4 | Butyl group/TBP | 0.23/0.77 | 31.2 |
| (B)'-1 | 100 |  |  | 0 |
| (B)'-2 | 0 |  |  | 0 |
| (B)'-3 | 0 |  |  | 0 |
| (B)'-4 | 50 |  |  | 0 |
| (B)'-5 | 50 |  |  | 0 |
| (B)'-6 | 0 |  |  | 0 |
| (B)'-7 | 1 | Hexyl group | 1/0 | 18 |
| (B)'-8 | 64 | Butyl group | 1/0 | 32 |
| (B)'-9 | 12.5 | TBP | 0/1 | 25 |
| (B)'-10 | 25 | Stearyl group | 1/0 | 50 |

| Component (B) | (B-3) R1 | (B-3) R2 | (B-3) Ratio 2 | (B-3) mol % | Average degree of polymerization |
|---|---|---|---|---|---|
| (B)-1 | Butyl group | Butyl group | 1/0 | 25 | 2.3 |
| (B)-2 | Butyl group | Butyl group | 1/0 | 32 | 4.2 |
| (B)-3 | Hexyl group | Hexyl group | 1/0 | 16 | 1.6 |
| (B)-4 | Butyl group/TBP | Butyl group/TBP | 0.2/0.8 | 62.5 | 2.3 |
| (B)-5 | Butyl group/TBP | Butyl group/TBP | 0.57/0.43 | 56.4 | 2.3 |
| (B)'-1 |  |  |  | 0 | 2.3 |
| (B)'-2 | TBP | TBP | 0/1 | 100 | 2.3 |
| (B)'-3 | Butyl group | Butyl group | 1/0 | 100 | 2.3 |
| (B)'-4 | TBP | TBP | 0/1 | 50 | 2.3 |
| (B)'-5 | Butyl group | Butyl group | 1/0 | 50 | 2.3 |
| (B)'-6 | Butyl group/TBP | Butyl group/TBP | 0.5/0.5 | 100 | 2.3 |
| (B)'-7 | Hexyl group | Hexyl group | 1/0 | 81 | 2.3 |
| (B)'-8 | Butyl group | Butyl group | 1/0 | 4 | 2.3 |
| (B)'-9 | TBP | TBP | 0/1 | 62.5 | 2.3 |
| (B)'-10 | Stearyl group | Stearyl group | 1/0 | 25 | 2.3 |

TABLE 4

|  | Component (A) Type | Component (A) Parts by weight | Component (B) Type | Component (B) Parts by weight | Antimony trioxide |
|---|---|---|---|---|---|
| Ex. 7 | (A)-1/(a-1) | 40/60 | (B)-1 | 20 | 5 |
| Ex. 8 | (A)-1/(a-1) | 40/60 | (B)-2 | 20 | 5 |
| Ex. 9 | (A)-1/(a-1) | 40/60 | (B)-3 | 20 | 5 |
| Ex. 10 | (A)-1/(a-1) | 40/60 | (B)-4 | 20 | 5 |
| Ex. 11 | (A)-1/(a-1) | 40/60 | (B)-5 | 20 | 5 |
| Ex. 12 | (A)-2/(a-1) | 30/70 | (B)-2 | 20 | 5 |
| Ex. 13 | (A)-2/(a-1) | 40/60 | (B)-5 | 20 | 5 |
| Ex. 14 | (A)-3/(a-1) | 30/70 | (B)-1 | 20 | 5 |
| Ex. 15 | (A)-4/(a-1) | 35/65 | (B)-1 | 20 | 5 |
| Comp. Ex. 4 | (A)-1/(a-1) | 40/60 | (B)'-1 | 20 | 5 |
| Comp. Ex. 5 | (A)-1/(a-1) | 40/60 | (B)'-2 | 20 | 5 |
| Comp. Ex. 6 | (A)-1/(a-1) | 40/60 | (B)'-3 | 20 | 5 |
| Comp. Ex. 7 | (A)-1/(a-1) | 40/60 | (B)'-4 | 20 | 5 |
| Comp. Ex. 8 | (A)-1/(a-1) | 40/60 | (B)'-5 | 20 | 5 |
| Comp. Ex. 9 | (A)-1/(a-1) | 40/60 | (B)'-6 | 20 | 5 |
| Comp. Ex. 10 | (A)-1/(a-1) | 40/60 | (B)'-7 | 20 | 5 |
| Comp. Ex. 11 | (A)-1/(a-1) | 40/60 | (B)'-8 | 20 | 5 |

|  | Chlorinated polyethylene | Mold releasability (kgf) | Heat stability | Light-resistance (ΔE) |
|---|---|---|---|---|
| Ex. 7 | 3 | 80 | ⊙ | 2.1 |
| Ex. 8 | 3 | 95 | ⊙ | 2.4 |
| Ex. 9 | 3 | 90 | ⊙ | 1.8 |
| Ex. 10 | 3 | 65 | ○ | 2.9 |
| Ex. 11 | 3 | 70 | ○ | 2.8 |
| Ex. 12 | 3 | 90 | ⊙ | 2.3 |
| Ex. 13 | 3 | 70 | ⊙ | 2.7 |
| Ex. 14 | 3 | 100 | ○ | 2.2 |
| Ex. 15 | 3 | 90 | ⊙ | 2.1 |
| Comp. Ex. 4 | 3 | 320 | x | 1.4 |
| Comp. Ex. 5 | 3 | 65 | ○ | 8.2 |
| Comp. Ex. 6 | 3 | 70 | ⊙ | 4.3 |
| Comp. Ex. 7 | 3 | 150 | x | 4.1 |
| Comp. Ex. 8 | 3 | 140 | x | 2.4 |
| Comp. Ex. 9 | 3 | 65 | ○ | 6.1 |
| Comp. Ex. 10 | 3 | 70 | ⊙ | 4.1 |
| Comp. Ex. 11 | 3 | 180 | x | 1.8 |

TABLE 4-continued

| | Flame retardancy | Burning time (sec) | Impact strength (kgf – cm) |
|---|---|---|---|
| Ex. 7 | V-0 | 20 | 140 |
| Ex. 8 | V-0 | 22 | 130 |
| Ex. 9 | V-0 | 30 | 100 |
| Ex. 10 | V-0 | 19 | 150 |
| Ex. 11 | V-0 | 18 | 140 |
| Ex. 12 | V-0 | 23 | 120 |
| Ex. 13 | V-0 | 19 | 120 |
| Ex. 14 | V-0 | 18 | 100 |
| Ex. 15 | V-0 | 19 | 150 |
| Comp. Ex. 4 | V-0 | 20 | 100 |
| Comp. Ex. 5 | V-0 | 18 | 150 |
| Comp. Ex. 6 | V-0 | 42 | 30 |
| Comp. Ex. 7 | V-0 | 16 | 100 |
| Comp. Ex. 8 | V-0 | 15 | 50 |
| Comp. Ex. 9 | V-0 | 14 | 110 |
| Comp. Ex. 10 | V-0 | 48 | 20 |
| Comp. Ex. 11 | V-0 | 21 | 100 |

As is apparent from the test results of Examples 7–15 in Table 4, the resin compositions according to the present invention have excellent mold releasability, heat stability and light-resistance and also show good flammability characteristics (flame retardancy).

Comparative Example 4 is the case using an "uncapped" type flame-retardant, in which the formulation of the component (B) is out of the scope of the present invention. Comparative Example 4 is unsatisfactory in mold releasability and heat stability.

Comparative Example 5 using a "capped" type flame-retardant, with the formulation of the component (B) being out of the scope of the present invention, is poor in light-resistance.

Comparative Example 6 is the case using as flame-retardant (B) a compound having a molecular structure perfectly capped with alkyl groups at both terminals, with the formulation of (B) being out of the scope of the present invention. Comparative Example 6 is unsatisfactory in light-resistance and impact strength.

Comparative Example 7 represents a case of single mixture of an uncapped type flame-retardant and a compound of a structure perfectly capped with tribromophenol, with the formulation of the component (B) being out of the scope of the present invention. This example is poor in mold releasability, heat stability and light-resistance.

Comparative Example 8 is also a case of simple mixture of an uncapped type flame-retardant and a flame-retardant of a structure perfectly capped with alkyl groups, with the formulation of the component (B) departing from the scope of the present invention. This case is poor in mold releasability and heat stability.

Comparative Example 9 is still another case of simple mixture of a flame-retardant perfectly capped with tribromophenol and a flame-retardant perfectly capped with alkyl groups, with the formulation of the component (B) being not included in the scope of the present invention. This example is poor in light-resistance.

Comparative Example 10 is a case where the percentages of (B-1) and (B-2) in the composition are high and the percentage of (B-3) is low, with the formulation of the component (B) not falling within the scope of the present invention. Comparative Example 10 is poor in light-resistance and impact strength.

Comparative Example 11, which represents a case of a high (B-1) percentage and a low (B-3) percentage, with the formulation of (B) being out of the scope of the present invention, is poor in mold releasability and heat stability.

What is claimed is:

1. A flame-retardant resin composition comprising:
   (A) 60 to 98 wt % of a thermoplastic resin comprising a rubber-reinforced resin (A-1) obtained by graft-polymerizing a monomer component (b) comprising an aromatic vinyl compound or an aromatic vinyl compound and other monomer(s) copolymerizable therewith in the presence of a rubber-like polymer (a), a polymer (A-2) obtained by polymerizing the monomer component (b), or a mixture of the resin (A-1) and the polymer (A-2); and
   (B) 40 to 2 wt % of a halogen-containing flame-retardant which comprises a mixture of compounds represented by the following formula (1), the mixture comprising 5 to 60 mol % of a compound (B-1) having epoxy groups at both terminals of the molecular chain, 15 to 70 mol % of a compound (B-2) having epoxy group at one terminal alone and 5 to 80 mol % of a compound (B-3) having no epoxy group at both terminals:

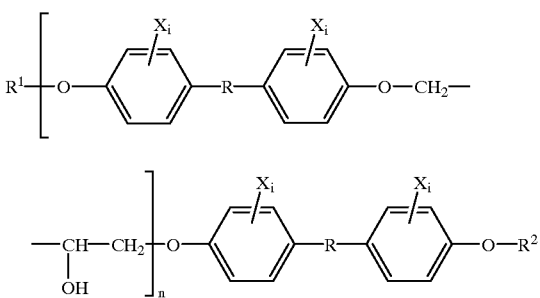

(1)

wherein X is a halogen atom; n is an integer of 0 or more; i is an integer of 1 to 4; each R is independently —C(CH$_3$)$_2$— or —CH$_2$—; and R$^1$ and R$^2$ are independenly selected from the group consisting of the following formulae (2) and (3);

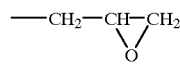

(2)

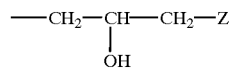

(3)

wherein Z is a group produced by reacting with a phenolic compound, a carboxylic acid compound, an amine-based compound or an alcoholic compound which is a reagent capable of causing a ring-opening addition reaction with the epoxy groups, and
(C) a halogenated polyolefin anti-drip agent present in an amount of 0.5 to 10 parts by weight based on 100 parts by weight of the composition {(A)+(B)}, wherein
the percentage of the rubber-like polymer (a) and monomer (b) of the rubber-reinforced resin (A-1), is 5 to 70 wt % and 95 to 30 wt %, respectively, provided that rubber-like polymer (a)+monomer (b)=100 wt %, the graft ratio given by the following equation of the rubber-reinforced resin (A-1) is 20 to 160%:

graft ratio (%)=100×(*t*−*s*)/*s* wherein s is the weight (g) of the rubber-like polymer (a) contained in 1 g of the rubber-reinforced resin (A-1), and t is the weight (g) of the insoluble matter when 1 g of the rubber-reinforced resin (A-1) is dissolved in methyl ethyl ketone, the intrinsic viscosity (n) of A-1, measured in methyl ethyl ketone at 30° C., is 0.1 to 1.5 l/g, and the content of the rubber-like polymer (a) being 4 to 30 parts by weight based on 100 parts by weight of the composition.

2. The flame-retardant resin composition according to claim 1, wherein the halogenated polyolefin is a chlorinated polyethylene.

3. The flame-retardant resin composition according to claim 1, wherein X is bromine or chlorine.

* * * * *